United States Patent
Abbasi et al.

(10) Patent No.: US 7,242,917 B2
(45) Date of Patent: Jul. 10, 2007

(54) APPARATUS AND METHOD FOR ANTENNA ATTACHMENT

(75) Inventors: Aamir Abbasi, Mundelein, IL (US); Roger Harmon, Crystal Lake, IL (US)

(73) Assignee: Motorola Inc., Schaumburg, IL (US)

( * ) Notice: Subject to any disclaimer, the term of this patent is extended or adjusted under 35 U.S.C. 154(b) by 579 days.

(21) Appl. No.: 10/288,630

(22) Filed: Nov. 5, 2002

(65) Prior Publication Data

US 2004/0087295 A1    May 6, 2004

(51) Int. Cl.
  *H04B 1/06*    (2006.01)
(52) U.S. Cl. ............... 455/277.1; 455/82; 455/281; 343/729
(58) Field of Classification Search ............. 455/67.11, 455/78, 90.3, 347, 557, 277.1, 79, 82, 269, 455/272, 280, 281; 343/702, 846, 724, 725, 343/729; 324/527, 549
See application file for complete search history.

(56) References Cited

U.S. PATENT DOCUMENTS

| | | | | |
|---|---|---|---|---|
| 3,794,941 | A | * | 2/1974 | Templin .................... 333/17.1 |
| 5,095,543 | A | * | 3/1992 | Dejmek ...................... 455/136 |
| 5,216,392 | A | * | 6/1993 | Fraser et al. ............... 333/17.3 |
| 5,991,599 | A | * | 11/1999 | Uchikawa ................... 455/20 |
| 6,226,492 | B1 | * | 5/2001 | Tsuda ........................ 455/12.1 |
| 6,278,869 | B1 | * | 8/2001 | Lindenmeier et al. ... 455/277.1 |
| 6,369,694 | B1 | * | 4/2002 | Mejia ........................ 340/10.1 |
| 6,437,577 | B1 | * | 8/2002 | Fritzmann et al. .......... 324/523 |
| 6,618,013 | B1 | * | 9/2003 | Aldous ....................... 343/702 |
| 6,622,009 | B1 | * | 9/2003 | Tolson .......................... 455/76 |
| 6,633,750 | B1 | * | 10/2003 | Dacus et al. ................ 455/126 |
| 6,853,197 | B1 | * | 2/2005 | McFarland et al. ......... 324/549 |
| 6,871,054 | B2 | * | 3/2005 | Kenkel et al. ........... 455/277.1 |
| 6,891,516 | B1 | * | 5/2005 | Saunders et al. ........... 343/895 |
| 2002/0142796 | A1 | * | 10/2002 | Sutton et al. ............... 455/553 |

* cited by examiner

*Primary Examiner*—Edward F. Urban
*Assistant Examiner*—Nhan T. Le
(74) *Attorney, Agent, or Firm*—Matthew C. Loppnow (57) ABSTRACT

An apparatus and method of for attaching an antenna to a mobile communication device. The apparatus can include radio frequency generation circuitry, a radio frequency feed point coupled to the radio frequency generation circuitry, a direct current voltage source coupled to the radio frequency feed point, and an antenna detection module coupled to the radio frequency feed point and the direct current voltage source. The antenna detection module is configured to detect a type of antenna coupled to the radio frequency feed point based on a detected direct current voltage. The antenna detection module can be coupled to the radio frequency feed point and a ground contact point. The apparatus can additionally include a parameter of operation adjustment module coupled to the antenna detection module. The adjustment circuitry can be configured to adjust a parameter of operation of the mobile communication device.

22 Claims, 7 Drawing Sheets

APPARATUS AND METHOD FOR ANTENNA ATTACHMENT

BACKGROUND OF THE INVENTION

1. Field of Invention

The present invention is directed to an apparatus and method for antenna attachment. In particular, the present invention is directed to an apparatus for attaching different antennas to a mobile communication device.

2. Description of Related Art

Presently, there are different antenna types available for mobile communication devices. Such antenna types can include stubby antennas, whip antennas, retractable antennas, patch antennas such as planar inverted-F antennas, car kits, even probes used for testing a device at an antenna contact, and other antennas. Mobile communication devices can include mobile phones, personal digital assistants, vehicle communication devices, laptops, or any other communication devices. Unfortunately, because different antenna types offer different performance and require different attaching techniques, the mobile communication devices can only be designed for one type of antenna. For example, different antennas may require different radio frequency (RF) input power. Furthermore, different antennas may have other different performance characteristics such as efficiency.

Another problem exists where different consumers and different service providers may desire different antennas. Unfortunately, antennas are not interchangeable. Thus, entire mobile communication device sections must be redesigned depending on consumer and service provider antenna requirements. Unfortunately, this process must be performed early in the design and manufacturing phase of a mobile communication device.

A further problem exists when a transceiver is tested in a factory or in the field using a probe. For such testing, the antenna must be disconnected and it is necessary to have a 50 ohm conducted measurement. Unfortunately, this is a difficult process because antennas are not readily disconnectable.

Thus, there is a need for improved antenna attachment circuitry that easily provides for removal and replacement of antennas.

SUMMARY OF THE INVENTION

The invention provides an apparatus and method of for attaching an antenna to a mobile communication device. The apparatus can include radio frequency generation circuitry, a radio frequency feed point coupled to the radio frequency generation circuitry, a direct current voltage source coupled to the radio frequency feed point, and an antenna detection module coupled to the radio frequency feed point and the direct current voltage source. The antenna detection module is configured to detect a type of antenna coupled to the radio frequency feed point based on a detected direct current voltage. The apparatus can also include a ground and a ground contact point coupled to the ground. The antenna detection module can be coupled to the radio frequency feed point and the ground contact point. The apparatus can additionally include a parameter of operation adjustment module coupled to the antenna detection circuitry. The adjustment circuitry can be configured to adjust a parameter of operation of the mobile communication device.

The apparatus can further include antenna matching circuitry coupled to the radio frequency feed point. The parameter of operation adjustment module can be configured to adjust the operation of the antenna matching circuitry based on the type of antenna detected by the antenna detection module. The parameter of operation adjustment module can be configured to adjust a radio frequency input power based on the type of antenna detected by the antenna detection module. The apparatus can additionally include a blocking resistor coupled between the direct current voltage source and the radio frequency feed point. The antenna detection module can be configured to detect the difference between a patch antenna and an ungrounded antenna. The apparatus can further include a voltage divider coupled between the antenna detection module and the radio frequency feed point.

The apparatus can also include a ground and an extra antenna sense point coupled to the antenna detection module where the extra antenna sense point can be located between the radio frequency feed point and the ground. The apparatus can additionally include a first resistance coupled between the direct current voltage source and the extra antenna sense point and a second resistance coupled between the extra antenna sense point and the ground. The antenna detection module can be configured to detect an alternate antenna configuration based on the extra antenna sense point being shorted to the ground. The apparatus can further include analog-to-digital conversion circuitry coupled between the antenna detection module and the radio frequency feed point. The antenna detection module can be configured to detect a type of antenna coupled to the radio frequency feed point based on a change in the detected direct current voltage. The apparatus can also include a test measurement probe coupled to the radio frequency feed point or a car kit coupled to the radio frequency feed point.

According to another embodiment, the present invention provides an apparatus for antenna attaching including radio frequency generation circuitry, a radio frequency feed point coupled to the radio frequency generation circuitry, the radio frequency feed point including a first antenna connection contact, a ground, a ground connection point coupled to the ground, the ground connection point including a second antenna connection contact, a direct current voltage source coupled to the radio frequency feed point and antenna detection circuitry coupled to the radio frequency feed point. The antenna detection circuitry can include analog-to-digital conversion circuitry.

The apparatus can also include mobile communication device parameter of operation adjustment circuitry coupled to the antenna detection circuitry. The apparatus can additionally include a radio frequency blocking resistance coupled between the first antenna connection point and the antenna detection circuitry. The apparatus can further include an extra connection point including a third antenna connection contact. The extra connection point can be coupled between the radio frequency feed point and the ground connection point.

According to another embodiment, the present invention provides a method of operating a mobile communication device including coupling a direct current voltage source to a radio frequency feed point, detecting a direct current voltage at the radio frequency feed point, detecting an antenna type based on the direct current voltage detected at the radio frequency feed point, and adjusting a parameter of operation of the mobile communication device based on the detected antenna type. Adjusting a parameter of operation further can include adjusting an antenna power level. Detecting an antenna type further can include performing analog-to-digital conversion on the detected direct current voltage.

The method can include coupling a patch antenna to a ground and the radio frequency feed point. The method can also include coupling a whip antenna to the radio frequency feed point and coupling a ground to an antenna sense point substantially simultaneously with coupling the whip antenna to the radio frequency feed point.

Among other benefits, added flexibility is thus provided to end users and carriers by offering recognition of different types of antennas, for example, for different markets and regions.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
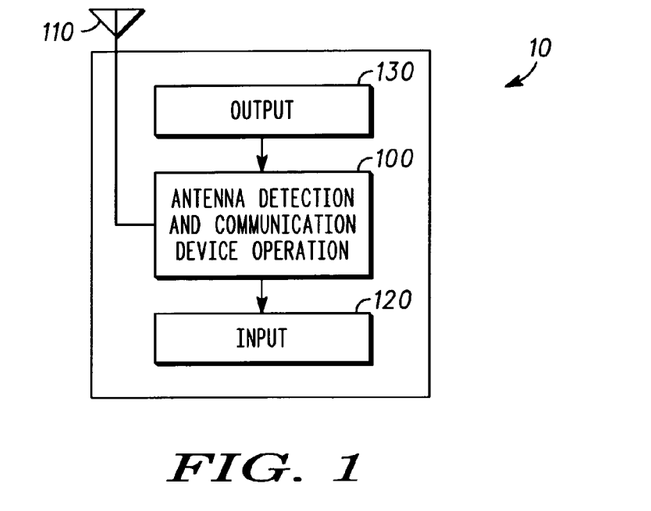
FIG. 1 is an exemplary block diagram of a mobile communication device according to a preferred embodiment.

FIG. 1 is an exemplary block diagram of a mobile communication device 10 according to a first embodiment. The mobile communication device 10 can include antenna detection and communication device operation circuitry 100 such as antenna attaching circuitry. The mobile communication device 10 can also include an antenna 110, input circuitry 120, and output circuitry 130. The input 120 can be an audio input, a tactile input, a keypad, a microphone, or any other input. The output 130 can be an audio output, a visual output, a display, a speaker, or any other output. In operation, the input 120 can receive input from a user of the mobile communication device 10 and the output 130 can output information to the user. The operation circuitry 100 can detect a type of antenna 110 based on a detected direct current voltage. The operation circuitry 100 can then adjust a parameter of operation of the mobile communication device 10 based on the detected antenna type.

The operation circuitry 100 thus provides a common inner module that allows for the postponement and/or replacement of an outer housing including different antenna types. Where postponement means delaying the addition of a feature until late in a device design, production, and/or manufacturing process. Thus, various antenna types may be used along with various outer housings. As illustrated in the examples below, the operation circuitry 100 provides for sensing of a type of antenna. The operation circuitry 100 may then adjust power levels, acoustical gains, and the like depending on the antenna and postponement combinations sensed. Furthermore, a device transceiver with the postponable housing removed can be used to do 50 ohm conducted measurements at antenna connection points without requiring a dedicated RF connector. Similarly, the same postponement piece can also be connected to a 50 ohm cable and then slid in place of the antenna for conducted measurements. Furthermore, postponable hands-free and car kits may be used by removing a postponable housing and docking the mobile communication device 10 in an accessory station where the accessory station may have an external antenna and audio and other control signals. Accordingly, by using an antenna RF connection as a DC sense line, an antenna type may be changed without electrically or mechanically redesigning a transceiver of the mobile communication device 10.

The mobile communication device 10 may utilize sliding clips, spring contacts, or any other electrical connection means for an antenna feed, ground, and other contacts. For example, for three possible types of antennas such as stubby, retractable, and patch antennas, different contacts may be used to determine the type of antenna. In particular, stubby and retractable antennas require only one contact as a feed point, but patch antennas require a feed point contact and a ground contact. Therefore, at least two antenna contacts may be used on the mobile communication device 10: one for the feed contact and one for the ground contact. As illustrated below, the feed contact may then be used by the operation circuitry 100 to sense the antenna type. According to one embodiment, one side of a high value series decoupling resistor is coupled with the feed point and the other end is coupled to a resistor divider and a A/D converter. For example, a 4–10 k ohm resistor may be used. Since a stubby antenna only uses a feed contact, the feed point side of the resistor would not be pulled to ground. However, a patch antenna requires both the feed point contact and a ground contact. Thus, a patch antenna would short the feed point to ground. The operation circuitry 100 can then detect the respective states and make appropriate adjustments of the mobile communication device 10. As illustrated below, additional contacts may be used in a voltage divider configuration for additional antenna type sensing.

Figure 2:
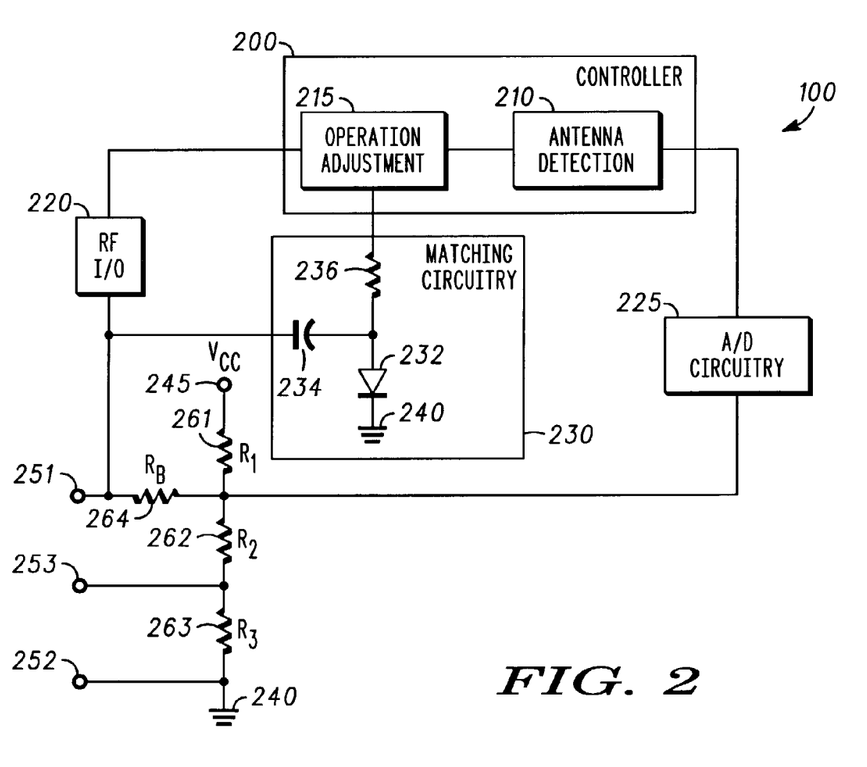
FIG. 2 is an exemplary diagram of an antenna detection and communication device operating circuitry according to a preferred embodiment.

FIG. 2 is an exemplary diagram of an antenna detection and communication device operating circuitry 100 according to one embodiment. The operating circuitry 100 can include a controller 200, an antenna detection module 210, a parameter of operation adjustment module 215, radio frequency input and output (RF I/O) circuitry 220, analog-to-digital conversion circuitry 225, matching circuitry 230, a ground 240, a direct current (DC) voltage source 245, a radio frequency (RF) feed point 251, a ground connection point 252, an extra antenna sense point 253, resistors 261–263 such as voltage divider resistors, and a blocking resistor 264. The matching circuitry 230 can include matching components for antenna matching. For example, the matching circuitry 230 can include a matching capacitance 234, a resistance 236, and a diode 232 coupled to the ground 240. The RF feed point 251 can include a first antenna contact and the ground connection point 252 can include a second antenna contact. The RF I/O circuitry 220 can include RF generation circuitry.

In operation, the DC voltage source 245 can be coupled to the RF feed point 251. For example the DC voltage source can provide any voltage other than a voltage at a frequency generated by the RF I/O circuitry 220. The A/D conversion circuitry 225 can convert a voltage detected at an opposite end of the blocking resistor 264 from the RF feed point 251. The blocking resistor 264 can operate to block RF signals from the A/D circuitry. Thus, the blocking resistor 264 can provide isolation of the A/D circuitry from the RF signals. The blocking resistor 264 aside, the voltage is detected substantially at the RF feed point 251.

The RF I/O circuitry 220 can generate a RF signal used for transmission and reception of signals by the mobile communication device 10. The controller 200 controls the operations of the mobile communication device 10. The antenna detection module 210 can detect a type of antenna coupled to the RF feed point 251. For example, the antenna detection module 210 can detect a type of antenna coupled to the RF feed point 251 based on a change in a detected DC voltage. For example, a whip or stubby type of antenna may only be contacted to the RF feed point 251, whereas a patch antenna would contact both the RF feed point 251 and the ground 252. Thus, a different DC voltage would be present at the RF feed point depending on the type of antenna connected to the mobile communication device 10. The antenna detection module 210 may also detect an alternate antenna configuration based on the extra antenna sense point 253 being shorted to the ground 240. As another example, the antenna detection module 210 can detect the DC voltage converted by the A/D conversion circuitry 225. Many different types of antennas may be detected such as whip antennas, stubby antennas, patch antennas such as planar inverted F antennas, test measurement probes, car kit antennas and related circuitry, or the like.

The parameter of operation adjustment module 215 can then adjust a parameter of operation of the mobile communication device 10 based on the detected type of antenna. For example, the parameter of operation can be operation of the antenna matching circuitry 230, RF input power, power to the input 120, power to the output 130, or any other parameter useful to adjust when a type of antenna is changed.

Figure 3:
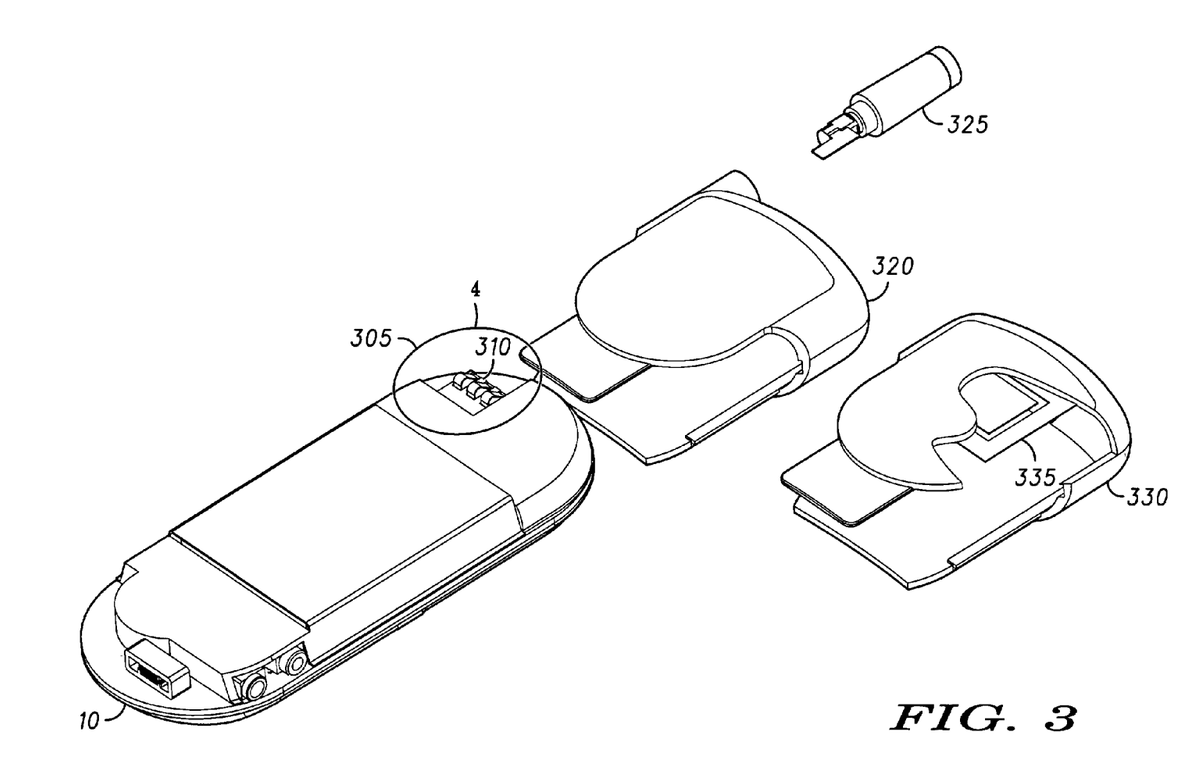
FIG. 3 is an exemplary illustration of housing coupling of the mobile communication device according to a preferred embodiment.

FIG. 3 is an exemplary illustration of housing coupling of the mobile communication device 10. The mobile communication device 10 can include a contact block 310. The mobile communication device 10 can be coupled with various top housings such as a stubby antenna top housing 320 for a stubby antenna 325, a patch antenna top housing 330 for a patch antenna 335, or any other top housing. In operation, the contact block 310 is used by the antenna detection module 210 to detect a top housing and respective antenna type attached to the mobile communication device 10. For example, the antenna detection module 210 can detect the difference between the patch antenna 335 and the stubby antenna 325. The parameter of operation adjustment module 215 may then adjust a parameter of operation of the mobile communication device 10 based on the detected antenna type.

Figure 4:
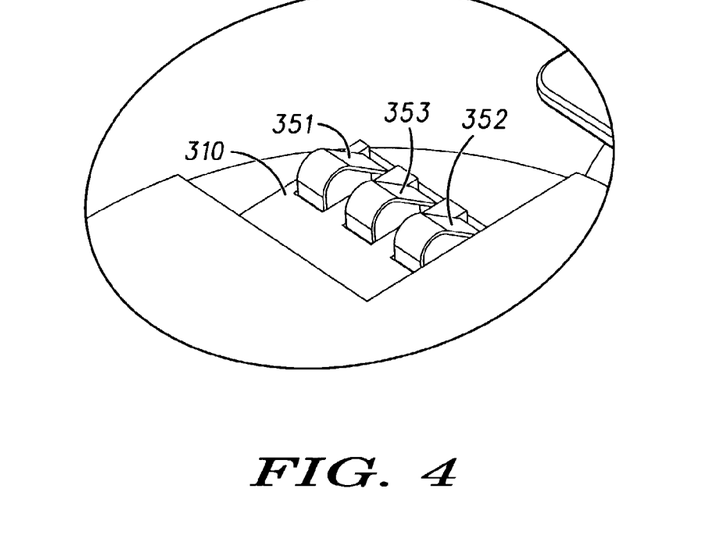
FIG. 4 is an exemplary exploded view of the antenna contact block according to a preferred embodiment.

FIG. 4 is an exemplary exploded view of the antenna contact block 310 according to one embodiment. The antenna contact block 310 can include contact points 351–353. The contact points 351–353 may correspond to RF feed point 251, ground contact point 252, and extra antenna sense point 253, respectively. The contact points 351–353 may be pogo pins, spring loaded pins, or any other device useful for making electrical contact between points. In operation, the contact points are used to make contact with different antenna types.

Figure 5:
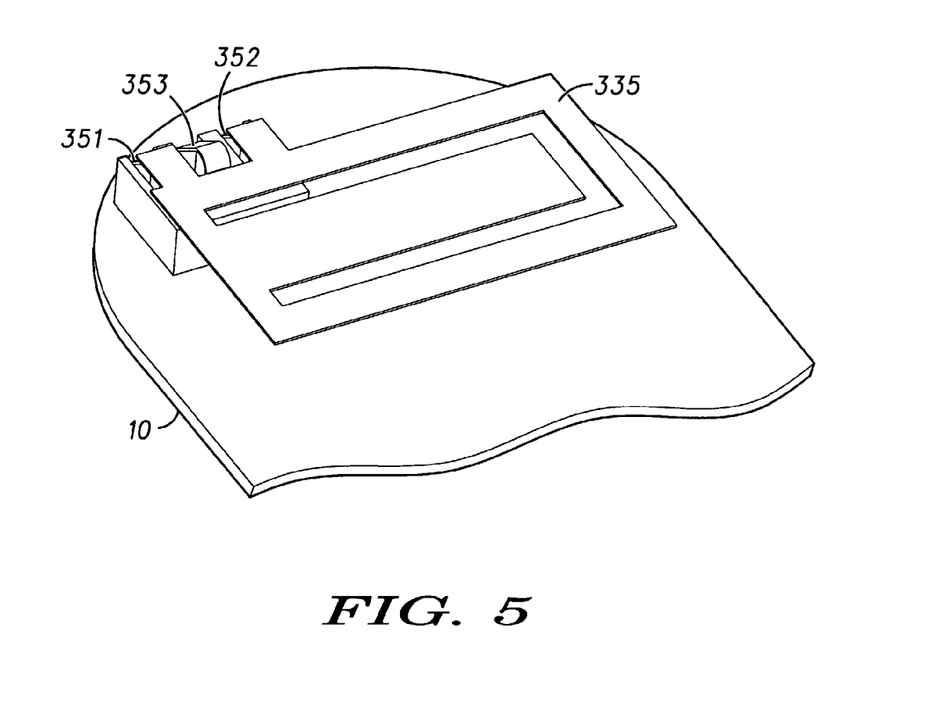
FIG. 5 is an exemplary illustration of a patch antenna coupled to the contact points according to a preferred embodiment.

FIG. 5 is an exemplary illustration of a patch antenna 335 coupled to the contact points 351 and 352. The patch antenna 335 may be a planar inverted-F antenna (PIFA). As shown, the patch antenna 335 makes contact with the point corresponding to the RF feed point 351 and the point corresponding to the ground contact point 352. Thus, the antenna detection module 210 can detect a patch type of antenna based on the effects of the connections with contact points 351 and 352 on the sensed DC voltage 245. The parameter of operation adjustment module 215 can then adjust a parameter of operation of the mobile communication device 10 accordingly.

Figure 6:
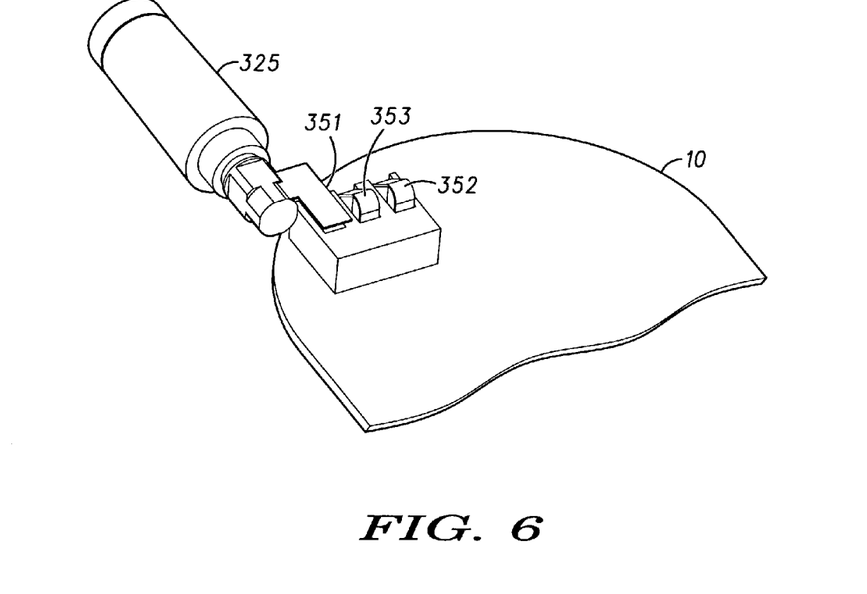
FIG. 6 is an exemplary illustration of a stubby antenna coupled to the contact points according to a preferred embodiment.

FIG. 6 is an exemplary illustration of a stubby antenna 325 coupled to the contact point 351. As shown, the stubby antenna 325 makes contact only with the point corresponding to the RF feed point 351 and no contact is made with the point corresponding to the ground contact point 352. Thus, the antenna detection module 210 can detect a stubby type of antenna based on the effects of the connections with contact point 351 on the sensed DC voltage 245. The parameter of operation adjustment module 215 can then adjust a parameter of operation of the mobile communication device 10 accordingly.

Figure 7:
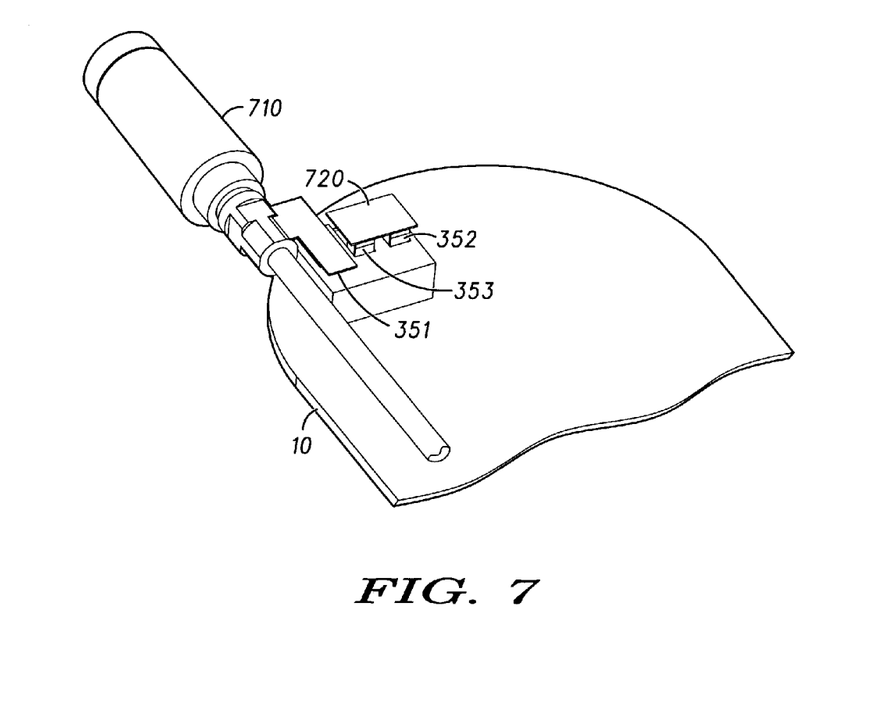
FIG. 7 is an exemplary illustration of a retractable or whip antenna coupled to the contact points according to a preferred embodiment.

FIG. 7 is an exemplary illustration of a retractable or whip antenna 710 coupled to the contact point 351. As shown, the retractable antenna 710 makes contact with the point corresponding to the RF feed point 351. An electrical contact strip or bar 720 may be used to short the point corresponding to the ground contact point 352 with the point corresponding to the extra antenna sense point 353. Thus, the antenna detection module 210 can detect a retractable type of antenna based on the effects of the connections with contact points 351–353 on the sensed DC voltage 245. In particular, the antenna detection module 210 can detect the change in voltage based on the resistor 263 being eliminated by shorting the extra antenna sense point 253 to the ground 240. The parameter of operation adjustment module 215 can then adjust a parameter of operation of the mobile communication device 10 accordingly.

Figure 8:
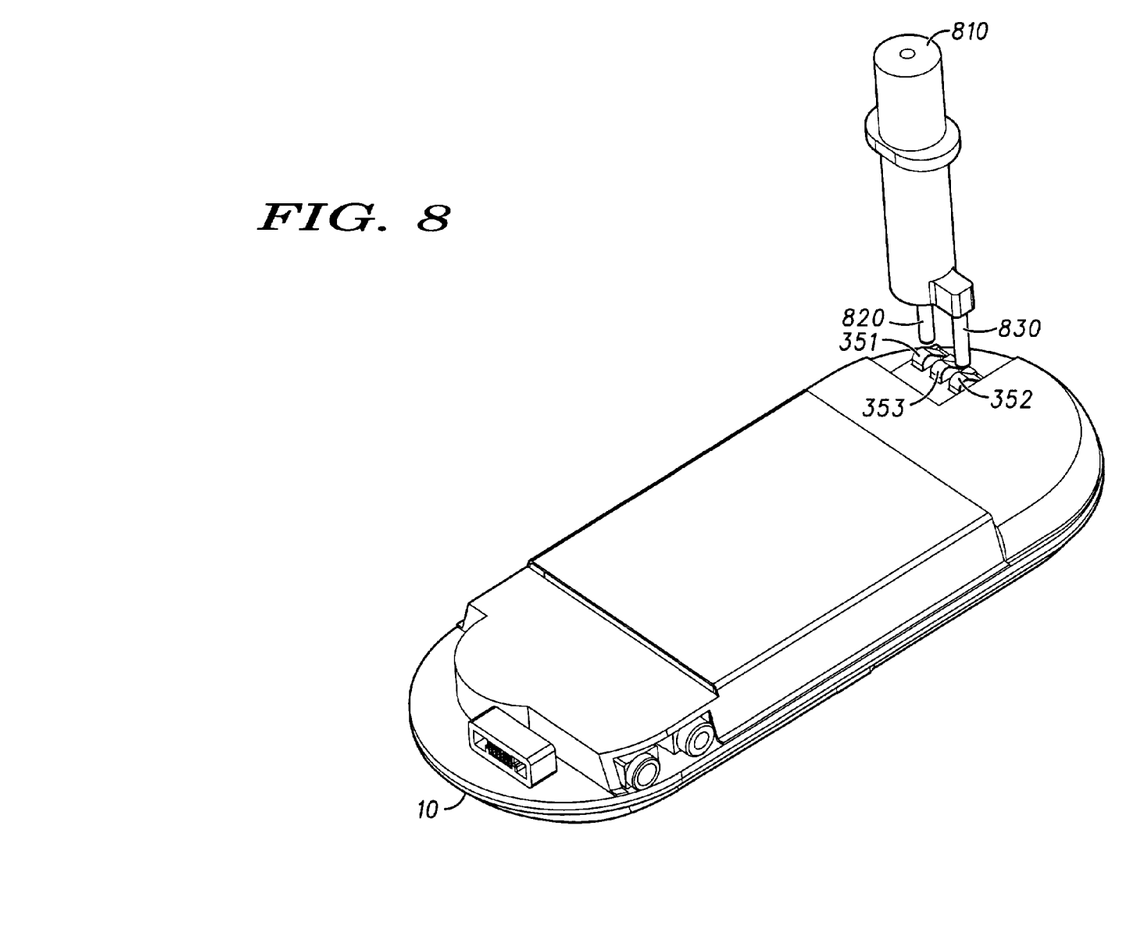
FIG. 8 is an exemplary illustration of a test probe coupled to the contact points according to a preferred embodiment.

FIG. 8 is an exemplary illustration of a test probe 810 coupled to the contact points 351 and 352. The test probe 810 can include pogo pins 820 and 830 or other contact means. Alternatively, the mobile communication device 10 may contain pogo pins or any other means for making contact with a test probe. As shown, the test probe 810 makes contact with the point corresponding to the RF feed point 351 and the point corresponding to the ground contact point 352. Thus, the antenna detection module 210 can detect the test probe based on the effects of the connections of the test probe pins 820 and 830 with contact points 351 and 352 on the sensed DC voltage 245. The parameter of operation adjustment module 215 can then adjust a parameter of operation of the mobile communication device 10 accordingly.

Figure 9:
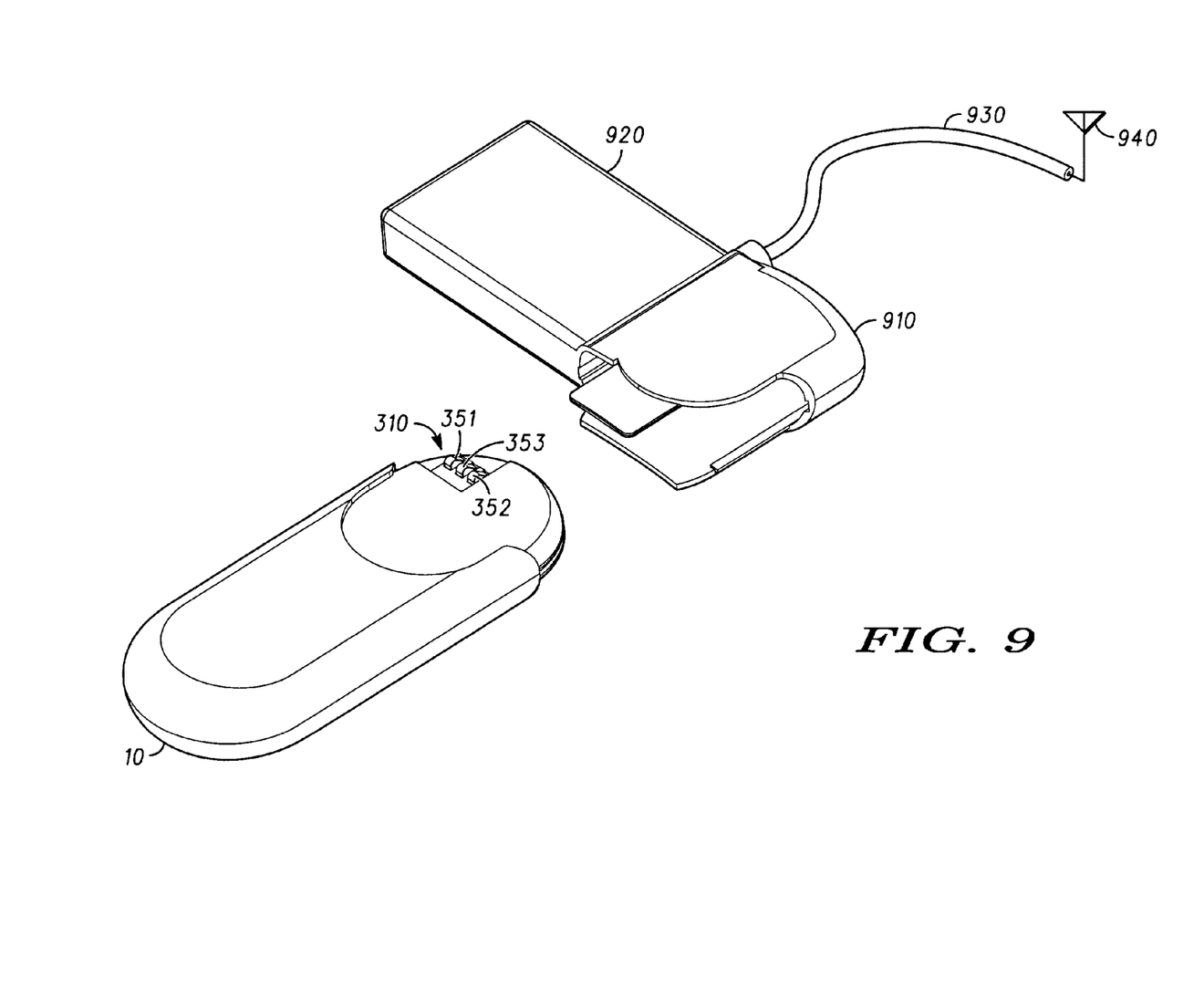
FIG. 9 is an exemplary illustration of a car kit top housing coupled to the contact points according to a preferred embodiment.

FIG. 9 is an exemplary illustration of a car kit 910 top housing coupled to at least the contact point 351. The car kit housing 910 can include car kit electronics 920 and a cable 930 coupled to an external car antenna 940. For example, the car kit electronics 920 can include a speaker, a microphone, an antenna amplifier, or any other circuitry useful for a car kit. The contact block 310 may also include audio connections, control lines, or any other connections useful for contact with a car kit. The car kit housing 910 can make contact with selected points of the contact block 310. Thus, the antenna detection module 210 can detect a car kit housing 910 based on the effects of the connections with the contact block 310 on the sensed DC voltage 245. The parameter of operation adjustment module 215 can then adjust a parameter of operation of the mobile communication device 10 accordingly.

Figure 10:
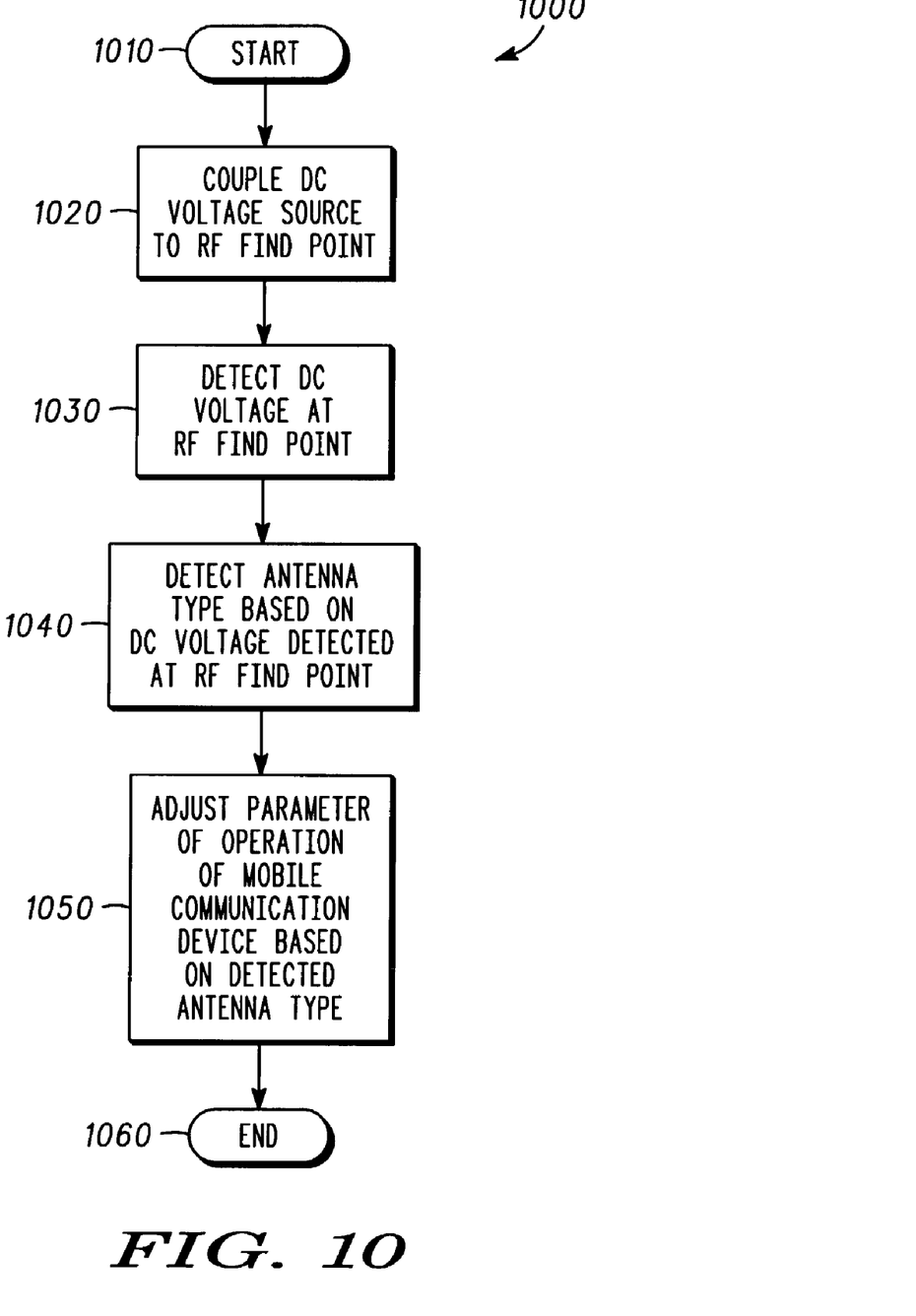
FIG. 10 is an exemplary flow chart outlining the operations of the mobile communication device according to a preferred embodiment.

FIG. 10 is an exemplary flow chart 1000 outlining the operations of the mobile communication device 10 according to a preferred embodiment. In step 1010, the outline begins. In step 1020, a DC voltage source 245 is coupled to the RF feed point 251. In step 1030, a DC voltage is detected at the RF feed point 251. In step 1040, an antenna type is detected based on the DC voltage detected at the RF feed point 251. In step 1050, a parameter of operation of the mobile communication device 10 is adjusted based on the detected antenna type. In step 1060, the flowchart ends.

The method of this invention is preferably implemented on a programmed processor. However, controller 200 and other functions of the mobile communication device 10 may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this invention.

While this invention has been described with specific embodiments thereof, it is evident that many alternatives, modifications, and variations will be apparent to those skilled in the art. For example, various components of the embodiments may be interchanged, added, or substituted in the other embodiments. Accordingly, the preferred embodiments of the invention as set forth herein are intended to be illustrative, not limiting. Various changes may be made without departing from the spirit and scope of the invention.

What is claimed is:

1. A mobile communication device comprising:
   radio frequency generation circuitry;
   a radio frequency feed point coupled to the radio frequency generation circuitry;
   a direct current voltage source coupled to the radio frequency feed point;
   an antenna detection module coupled to the radio frequency feed point and the direct current voltage source, wherein the antenna detection module is configured to detect a type of antenna coupled to the radio frequency feed point based on a detected direct current voltage;
   a parameter of operation adjustment module coupled to the antenna detection module, wherein the adjustment circuitry is configured to adjust a parameter of operation of the mobile communication device; and
   antenna matching circuitry coupled to the radio frequency feed point,
   wherein the parameter of operation adjustment module is configured to adjust the operation of the antenna matching circuitry based on the type of antenna detected by the antenna detection module;
   a ground; and
   an extra antenna sense point coupled to the antenna detection module, the extra antenna sense point located between the radio frequency feed point and the ground.

2. The mobile communication device according to claim 1, further comprising:
   a ground; and
   a ground contact point coupled to the ground, wherein the antenna detection module is coupled to the radio frequency feed point and the ground contact point.

3. The mobile communication device according to claim 1,
   wherein the parameter of operation adjustment module is configured to adjust a radio frequency input power based on the type of antenna detected by the antenna detection module.

4. The mobile communication device according to claim 1, further comprising:
   a blocking resistor coupled between the direct current voltage source and the radio frequency feed point.

5. The mobile communication device according to claim 1,
   wherein the antenna detection module is configured to detect the difference between a patch antenna and an ungrounded antenna.

6. The mobile communication device according to claim 1, further comprising:
   a voltage divider coupled between the antenna detection module and the radio frequency feed point.

7. The mobile communication device according to claim 1, further comprising:
   a first resistance coupled between the direct current voltage source and the extra antenna sense point; and
   a second resistance coupled between the extra antenna sense point and the ground.

8. The mobile communication device according to claim 1,
   wherein the antenna detection module is configured to detect an alternate antenna configuration based on the extra antenna sense point being shorted to the ground.

9. The mobile communication device according to claim 1, further comprising:
   analog-to-digital conversion circuitry coupled between the antenna detection module and the radio frequency feed point.

10. The mobile communication device according to claim 1, further comprising:
    wherein the antenna detection module is configured to detect a type of antenna coupled to the radio frequency feed point based on a change in the detected direct current voltage.

11. The mobile communication device according to claim 1, further comprising:
    a test measurement probe coupled to the radio frequency feed point.

12. The mobile communication device according to claim 1, further comprising:
    a car kit coupled to the radio frequency feed point.

13. Antenna attachment circuitry for detecting a plurality of antenna configurations coupled to a mobile communication device, the antenna attachment circuitry comprising:
    radio frequency generation circuitry;
    a radio frequency feed point coupled to the radio frequency generation circuitry, the radio frequency feed point including a first antenna connection contact;
    a ground;
    a ground connection point coupled to the ground, the ground connection point including a second antenna connection contact;
    a direct current voltage source coupled to the radio frequency feed point; and antenna detection circuitry coupled to the radio frequency feed point, the antenna detection circuitry configured to detect an antenna type based on inherent characteristics of the antenna, wherein the antenna attachment circuitry further comprises:

an extra antenna sense point including an extra antenna connection point with a third antenna connection contact, the extra antenna sense point coupled between the radio frequency feed point and the ground connection point.

14. The antenna attachment circuitry according to claim 13, wherein the antenna detection circuitry includes analog-to-digital conversion circuitry.

15. The antenna attachment circuitry according to claim 13, further comprising:

mobile communication device parameter of operation adjustment circuitry coupled to the antenna detection circuitry.

16. The antenna attachment circuitry according to claim 13, further comprising:

a radio frequency blocking resistance coupled between the first antenna connection point and the antenna detection circuitry.

17. The antenna attachment circuitry according to claim 13, wherein the antenna type comprises a stubby antenna and the inherent characteristics of the antenna comprise not pulling the radio frequency feed point side to ground when the antenna is attached.

18. The antenna attachment circuitry according to claim 13, wherein the antenna type comprises a patch antenna and the inherent characteristics of the antenna comprise shorting the radio frequency feed point side to ground when the antenna is attached.

19. A method of operating a mobile communication device, comprising:

coupling a direct current voltage source through a blocking resistor to a radio frequency feed point;

detecting a direct current voltage at the radio frequency feed point;

detecting an antenna type based on the direct current voltage detected at the radio frequency feed point; and adjusting a parameter of operation of the mobile communication device based on the detected antenna type, wherein the method further comprises:

coupling a whip antenna to the radio frequency feed point; and coupling a ground to an antenna sense point substantially simultaneously with coupling the whip antenna to the radio frequency feed point.

20. The method of operating a mobile communication device according to claim 19, wherein adjusting a parameter of operation further comprises adjusting an antenna power level.

21. The method of operating a mobile communication device according to claim 19, wherein detecting an antenna type further comprises performing analog-to-digital conversion on the detected direct current voltage.

22. The method of operating a mobile communication device according to claim 19, further comprising:

coupling a patch antenna to a ground and the radio frequency feed point.

* * * * *